(12) United States Patent
Boehner et al.

(10) Patent No.: US 12,506,672 B2
(45) Date of Patent: Dec. 23, 2025

(54) LATENCY MEASUREMENT SYSTEM AND METHOD

(71) Applicant: GM Global Technology Operations LLC, Detroit, MI (US)

(72) Inventors: Shane M. Boehner, Fenton, MI (US); Sudhakaran Maydiga, Troy, MI (US); Steve DiBella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 18/341,932

(22) Filed: Jun. 27, 2023

(65) Prior Publication Data

US 2025/0007804 A1    Jan. 2, 2025

(51) Int. Cl.
*H04L 43/0852* (2022.01)

(52) U.S. Cl.
CPC ................. *H04L 43/0852* (2013.01)

(58) Field of Classification Search
CPC ................. H04L 43/0852; H04L 67/12
See application file for complete search history.

(56) References Cited

U.S. PATENT DOCUMENTS

| 5,521,907 A * | 5/1996 | Ennis, Jr. ............... H04L 67/564 370/253 |
| 2007/0198202 A1* | 8/2007 | Fishman ........... G01R 31/31728 702/69 |
| 2018/0048713 A1* | 2/2018 | Brine ....................... H04L 43/08 |
| 2021/0250405 A1* | 8/2021 | Tutuianu ............ G01R 31/2874 |
| 2022/0231769 A1* | 7/2022 | Ziegler ..................... H04B 3/46 |
| 2024/0103043 A1* | 3/2024 | Ohlen ................ G01R 13/0218 |

FOREIGN PATENT DOCUMENTS

CN            109997336 A      7/2019

* cited by examiner

*Primary Examiner* — Abdullahi E Salad
(74) *Attorney, Agent, or Firm* — Vivacqua Crane, PLLC (57) ABSTRACT

A latency measurement system includes a controller having a first input port and a second input port. The controller is programmed to receive a start trigger signal using the first input port. The controller is further programmed to perform a first action in response to receiving the start trigger signal. The controller is further programmed to receive a stop trigger signal using the second input port. The controller is further programmed to perform a second action in response to receiving the stop trigger signal. The controller is further programmed to determine a latency measurement based at least in part on the first action and the second action.

15 Claims, 5 Drawing Sheets

LATENCY MEASUREMENT SYSTEM AND METHOD

INTRODUCTION

The present disclosure relates to systems and methods for latency measurement for communications between electrical devices, and more particularly, to systems and methods for latency measurement for communications between electrical devices in vehicle electrical systems.

Vehicles may be equipped with various electrical devices, such as, for example, controllers (e.g., a powertrain control module, a brake control module, a body control module, and/or the like), sensors, and actuators. Sensors and actuators may be in communication with the controllers, such that sensors may gather information and/or detect stimuli and the controllers may analyze the sensor data and provide signals to the actuators. Vehicles may be equipped with multiple controllers which are configured to handle particular aspects of vehicle operation. In some cases, controllers may be placed near corresponding sensors and/or actuators. In other cases, controllers may be placed in a central location of the vehicle. In both cases, it may be necessary to accurately measure latency of communications between vehicle electrical devices for purposes of development, troubleshooting, and testing.

Thus, while current latency measurement systems and methods achieve their intended purpose, there is a need for a new and improved system and method for latency measurement for communications between electrical devices in a vehicle.

SUMMARY

According to several aspects, a latency measurement system is provided. The latency measurement system includes a controller having a first input port and a second input port. The controller is programmed to receive a start trigger signal using the first input port. The controller is further programmed to perform a first action in response to receiving the start trigger signal. The controller is further programmed to receive a stop trigger signal using the second input port. The controller is further programmed to perform a second action in response to receiving the stop trigger signal. The controller is further programmed to determine a latency measurement based at least in part on the first action and the second action.

In another aspect of the present disclosure, the first input port is in electrical communication with a first device under test (DUT). The start trigger signal is at least one of a rising edge and a falling edge of a digital logic signal.

In another aspect of the present disclosure, the second input port is in electrical communication with a second device under test (DUT). The stop trigger signal is at least one of a rising edge and a falling edge of a digital logic signal.

In another aspect of the present disclosure, to perform the first action, the controller is further programmed to record a first timestamp in response to receiving the start trigger signal. To perform the first action, the controller is further programmed to perform a first error checking action in response to receiving the start trigger signal.

In another aspect of the present disclosure, to perform the first error checking action, the controller is further programmed to identify a previously received trigger signal type. The trigger signal type includes at least one of the start trigger signal and the stop trigger signal. To perform the first error checking action, the controller is further programmed to store an error log in a non-transitory memory of the controller in response to determining that the previously received trigger signal type is the start trigger signal.

In another aspect of the present disclosure, to perform the second action, the controller is further programmed to record a second timestamp in response to receiving the stop trigger signal. To perform the second action, the controller is further programmed to perform a second error checking action in response to receiving the stop trigger signal. To perform the second action, the controller is further programmed to calculate the latency measurement based at least in part on the first timestamp and the second timestamp. The latency measurement is stored in a non-transitory memory of the controller. To perform the second action, the controller is further programmed to calculate at least one latency measurement statistic based at least in part on a plurality of latency measurements stored in the non-transitory memory of the controller.

In another aspect of the present disclosure, to perform the second error checking action, the controller is further programmed to identify a previously received trigger signal type. The trigger signal type includes one of the start trigger signal and the stop trigger signal. To perform the second error checking action, the controller is further programmed to store an error log in the non-transitory memory of the controller in response to determining that the previously received trigger signal type is the stop trigger signal.

In another aspect of the present disclosure, the controller further includes a network interface in electrical communication with a data acquisition system. The controller is further programmed to transmit the at least one latency measurement statistic to the data acquisition system using the network interface.

In another aspect of the present disclosure, the controller further includes a first output port in electrical communication with at least one of the first input port and the second input port. The controller is further programmed to perform a calibration action using at least the first output port and at least one of the first input port and the second input port.

In another aspect of the present disclosure, to perform the calibration action, the controller is further programmed to provide a test pulse having a predetermined expected test duration to at least one of the first input port and the second input port using the first output port. To perform the calibration action, the controller is further programmed to measure an actual test duration of the test pulse using at least one of the first input port and the second input port. To perform the calibration action, the controller is further programmed to determine a difference between the actual test duration and the predetermined expected test duration. To perform the calibration action, the controller is further programmed to calibrate a system timer module of the controller based at least in part on the difference between the actual test duration and the predetermined expected test duration.

According to several aspects, a method for measuring network latency is provided. The method includes electrically connecting a plurality of devices under test (DUTs) to a controller. Each of the plurality of DUTs is connected to one of a plurality of input ports of the controller. Each of the plurality of DUTs is configured to send a start trigger signal to one of the plurality of input ports upon transmitting a data message. Each of the plurality of DUTs is configured to send a stop trigger signal to one of the plurality of input ports upon receiving the data message. The method also includes receiving the start trigger signal, performing a first action in response to receiving the start trigger signal, receiving the stop trigger signal, performing a second action in response to receiving the stop trigger signal, and determining a latency measurement based at least in part on the first action and the second action.

In another aspect of the present disclosure, performing the first action further may include recording a first timestamp in a non-transitory memory of the controller in response to receiving the start trigger signal. Performing the first action further may include performing a first error checking action in response to receiving the start trigger signal.

In another aspect of the present disclosure, performing the first error checking action further may include identifying a previously received trigger signal type. The trigger signal type includes at least one of the start trigger signal and the stop trigger signal. Performing the first error checking action further may include storing an error log in the non-transitory memory of the controller in response to determining that the previously received trigger signal type is the start trigger signal.

In another aspect of the present disclosure, performing the second action further may include recording a second timestamp in response to receiving the stop trigger signal. Performing the second action further may include performing a second error checking action in response to receiving the stop trigger signal. Performing the second action further may include calculating the latency measurement based at least in part on the first timestamp and the second timestamp. Performing the second action further may include storing the latency measurement in the non-transitory memory of the controller. Performing the second action further may include calculating at least one latency measurement statistic based at least in part on a plurality of latency measurements stored in the non-transitory memory of the controller.

In another aspect of the present disclosure, performing the second error checking action further may include identifying a previously received trigger signal type. The trigger signal type includes at least one of the start trigger signal and the stop trigger signal. Performing the second error checking action further may include storing an error log in the non-transitory memory of the controller in response to determining that the previously received trigger signal type is the stop trigger signal.

In another aspect of the present disclosure, the method further includes transmitting the at least one latency measurement statistic to a data acquisition system using a network interface of the controller.

In another aspect of the present disclosure, the method further includes receiving the at least one latency measurement statistic using the data acquisition system. The method further includes generating a graphical visualization of the at least one latency measurement statistic using the data acquisition system.

According to several aspects, a latency measurement system for a vehicle is provided. The latency measurement system includes a controller having a first input port in electrical communication with a first device under test (DUT), a second input port in electrical communication with a second device under test (DUT), and a network interface in electrical communication with a data acquisition system. The controller is programmed to receive a start trigger signal using the first input port. The controller is further programmed to perform a first action in response to receiving the start trigger signal. The controller is further programmed to receive a stop trigger signal using the second input port. The controller is further programmed to perform a second action in response to receiving the stop trigger signal. The controller is further programmed to determine a latency measurement based at least in part on the first action and the second action. The controller is further programmed to calculate at least one latency measurement statistic based at least in part on a plurality of latency measurements stored in a non-transitory memory of the controller. The controller is further programmed to transmit the at least one latency measurement statistic to the data acquisition system using the network interface.

In another aspect of the present disclosure, to perform the first action, the controller is further programmed to record a first timestamp in response to receiving the start trigger signal. To perform the first action, the controller is further programmed to identify a previously received trigger signal type. The trigger signal type includes at least one of the start trigger signal and the stop trigger signal. To perform the first action, the controller is further programmed to store an error log in a non-transitory memory of the controller in response to determining that the previously received trigger signal type is the start trigger signal.

In another aspect of the present disclosure, to perform the second action, the controller is further programmed to record a second timestamp in response to receiving the stop trigger signal. To perform the second action, the controller is further programmed to identify a previously received trigger signal type. The trigger signal type includes at least one of the start trigger signal and the stop trigger signal. To perform the second action, the controller is further programmed to store an error log in the non-transitory memory of the controller in response to determining that the previously received trigger signal type is the stop trigger signal. To perform the second action, the controller is further programmed to calculate the latency measurement based at least in part on the first timestamp and the second timestamp. To perform the second action, the controller is further programmed to store the latency measurement in the non-transitory memory of the controller.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some vehicle electrical architectures, controller units may be aggregated in a central location, potentially far from other vehicle components which must communicate with the controller units. Communication latency between devices in vehicle systems may result in unexpected behaviors and/or difficult to diagnose errors. Therefore, the present disclosure provides a system and method to quantify transmission latency between vehicle devices, allowing for faster development of new vehicle electrical systems and diagnosis of faults in current vehicle electrical systems.

Figure 1:
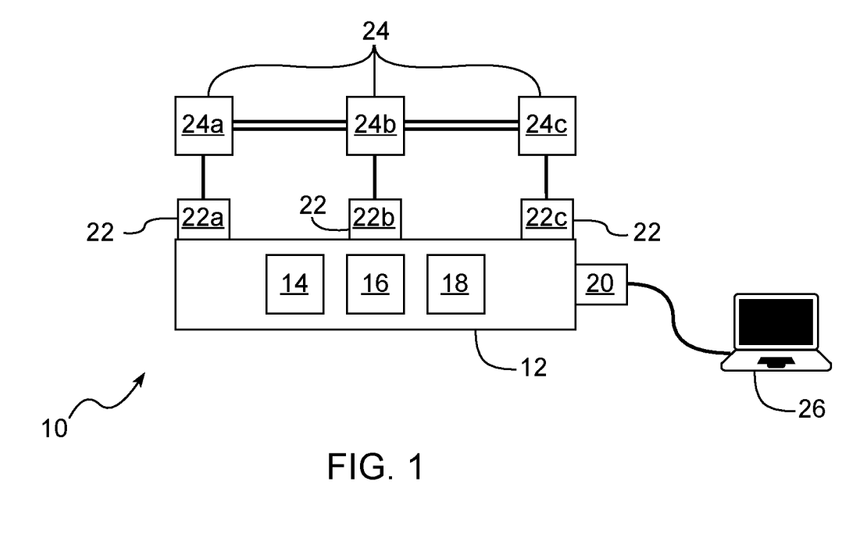
FIG. 1 is a schematic diagram of a latency measurement system, according to an exemplary embodiment.

Referring to FIG. 1, a latency measurement system is illustrated and generally indicated by reference number 10. The system 10 generally includes a controller 12.

The controller 12 is used to implement a method 100 for measuring network latency, as will be described below. The controller 12 includes at least one processor 14, a non-transitory computer readable storage device or media 16, a system timer module 18, a network interface 20, and a plurality of input ports 22.

The processor 14 may be a custom made or commercially available processor, a central processing unit (CPU), a graphics processing unit (GPU), an auxiliary processor among several processors associated with the controller 12, a semiconductor-based microprocessor (in the form of a microchip or chip set), a macroprocessor, a combination thereof, or generally a device for executing instructions. The controller 12 may also consist of multiple controllers which are in electrical communication with each other.

The computer readable storage device or media 16 may include volatile and nonvolatile storage in read-only memory (ROM), random-access memory (RAM), and keep-alive memory (KAM), for example. KAM is a persistent or non-volatile memory that may be used to store various operating variables while the processor 14 is powered down. The computer-readable storage device or media 16 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 12 to perform the method 100.

The system timer module 18 is used to track and manage timing and synchronization of various system operations and events of the controller 12. In a non-limiting example, the system timer module 18 operates by utilizing a precise clock source, for example, a crystal oscillator, to generate a consistent and accurate time base for the controller 12. Through a series of internal registers and counters, the system timer module 18 keeps track of time intervals, allowing for precise timing control and synchronization of events. The system timer module 18 facilitates the execution of time-dependent functions, such as scheduling tasks, generating time delays, measuring time differences between events, and coordinating system operations with external devices. The system timer module 18 operates in conjunction with the processor 14. The processor 14 may periodically query the system timer module 18 to retrieve time-related information, such as, for example, a timestamp. By evaluating a difference between two retrieved timestamps, the controller 12 may determine an elapsed time between the two retrieved timestamps. The system timer module 18 is in electrical communication with the controller 12. In an exemplary embodiment, the system timer module 18 is integrated into the controller 12 as a peripheral.

The network interface 20 is used by the controller 12 to communicate with an external device, such as, for example, a data acquisition system 26. This network interface 20 is configured to facilitate data exchange between two or more devices. In an exemplary embodiment, the network interface 20 operates using networking protocols, such as Ethernet or Wi-Fi. It should be understood that other communication protocols, such as, for example, near-field communication, BLUETOOTH, CAN bus, universal serial bus (USB), and/or the like are also within the scope of the present disclosure. In a non-limiting example, the network interface 20 employs a combination of hardware and software components to establish and maintain connections. In a non-limiting example, the network interface 20 utilizes communication protocols, such as, for example, TCP/IP or UDP to enable transmission and reception of data packets. The network interface 20 may handle tasks such as data encapsulation, error detection and correction, packet routing, and network addressing. The network interface 20 is in electrical communication with the controller 12. In an exemplary embodiment, the network interface 20 is integrated into the controller 12 as a peripheral.

The data acquisition system 26 is used to aggregate and process data produced by the controller 12 and transmitted by the network interface 20. In an exemplary embodiment, the data acquisition system 26 is a personal computing device, such as, for example, a laptop computer, a desktop computer, a tablet, a smartphone, and/or the like. In another exemplary embodiment, the data acquisition system 26 is a cloud-based server system, such as, for example, a server farm. The data acquisition system 26 typically includes at least a central processing unit (CPU), a non-transitory memory, and a display. In a non-limiting example, the data acquisition system 26 uses the CPU and the non-transitory memory to perform analysis of data produced by the controller 12 and produce visuals (e.g., graphics, tables, and/or the like) for display using the display. The data acquisition system 26 is in electrical communication with the network interface 20. It should be understood that the electrical communication between the data acquisition system 26 and the network interface 20 may be accomplished using a wired and/or a wireless communication protocol without departing from the scope of the present disclosure.

The plurality of input ports 22 are used to allow the controller 12 to receive signals from other devices and/or systems external to the controller 12. In an exemplary embodiment, the plurality of input ports 22 are general purpose input output (GPIO) ports which may be software and/or hardware configured to function as input ports. In an exemplary embodiment, the plurality of input ports provide additional functionality such as, for example, pull-up and/or pull-down resistors, filters, amplifiers, analog-to-digital converters, and/or the like. In a non-limiting example, when a signal is received using one of the plurality of input ports 22, an interrupt routine is initiated which interrupts a normal control-flow of a program running on the processor 14. The interrupt routine may be configured to take action based on the received signal. Therefore, using the plurality of input ports 22 and interrupt routines, the controller 12 may respond to external signals when an interrupt is received without a need for continuously polling the plurality of input ports 22.

It should be understood that the controller 12 may include additional components and/or peripherals without departing from the scope of the present disclosure.

In an exemplary embodiment, plurality of input ports 22 are in electrical communication with a plurality of devices under test (DUTs) 24. In the scope of the present disclosure, the plurality of DUTs are devices in electrical communication with each other. The system 10 is used to measure a latency of communication between the plurality of DUTs 24. In a non-limiting example, the plurality of DUTs 24 includes devices such as a vehicle controller (e.g., a vehicle electronic control unit), a vehicle sensor (e.g., a vehicle suspension damper sensor), a vehicle actuator (e.g., a vehicle active suspension actuator), a vehicle display system (e.g., a vehicle infotainment head unit) and/or the like. In an exemplary embodiment, the electrical communication between the plurality of DUTs is established using, for example, a CAN network, a FLEXRAY network, a local area network (e.g., WiFi, ethernet, and the like), a serial peripheral interface (SPI) network, and/or the like. It should be understood that various additional wired and/or wireless techniques and communication protocols for communicating between the plurality of DUTs are within the scope of the present disclosure.

Each of the plurality of DUTs 24 is configured to send a signal to one of the plurality of input ports 22 upon sending/receiving a communication to/from another of the plurality of DUTs 24. In an exemplary embodiment, a first DUT 24a of the plurality of DUTs 24 is in electrical communication with a first input port 22a of the plurality of input ports 22. A second DUT 24b of the plurality of DUTs 24 is in electrical communication with a second input port 22b of the plurality of input ports 22. A third DUT 24c of the plurality of DUTs 24 is in electrical communication with a third input port 22c of the plurality of input ports 22. Accordingly, the controller 12 receives signals from the plurality of DUTs 24 and determines network latency, as will be discussed in greater detail below. For the sake of clarity, the present disclosure discusses an exemplary embodiment wherein the plurality of DUTs 24 includes three devices. However, it should be understood that the plurality of DUTs 24 may include any number of devices without departing from the scope of the present disclosure.

Figure 2:
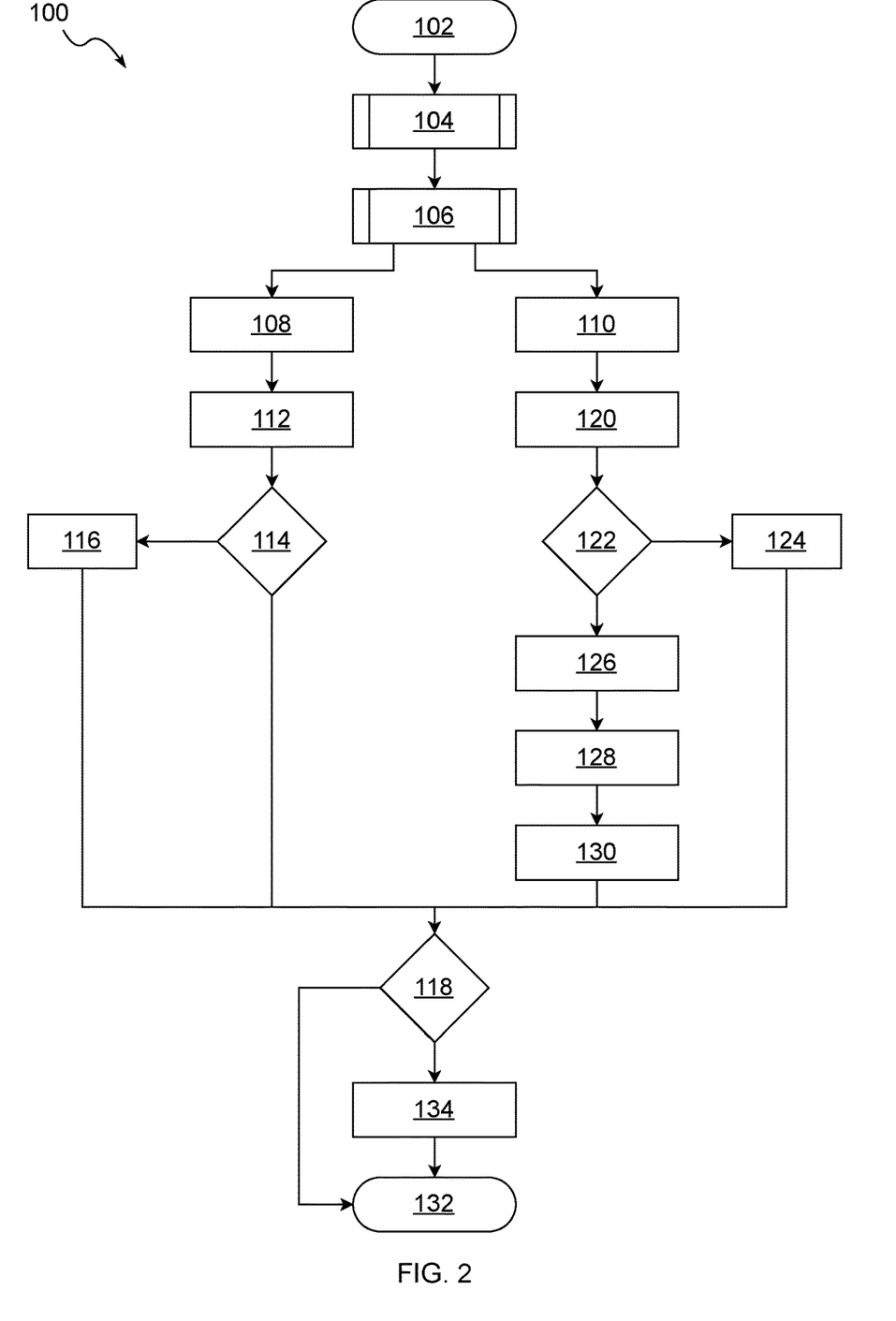
FIG. 2 is a flowchart of a method for measuring network latency, according to an exemplary embodiment.

Referring to FIG. 2, a flowchart of the method 100 for measuring network latency is shown. For the sake of clarity, the following explanation will refer primarily to measuring a network latency of a transmission between the first DUT 24a and the second DUT 24b. However, it should be understood that the same and/or a similar method may be used to measure network latency between any combination of the plurality of DUTs 24.

The method 100 begins at block 102 and proceeds to block 104. At block 104, the controller 12 performs a setup routine to configure the controller 12 to perform the method 100, as will be discussed in greater detail below. After block 104, the method 100 proceeds to block 106. At block 106, the controller 12 performs a calibration routine, as will be discussed in greater detail below. After block 106, the method 100 proceeds to blocks 108 and 110.

At block 108, the controller 12 receives a start trigger signal from the first DUT 24a using the first input port 22a. In an exemplary embodiment, the start trigger signal is a rising edge of a digital logic signal. In another exemplary embodiment, the start trigger signal is a falling edge of a digital logic signal. In a non-limiting example, the start trigger signal initiates a hardware interrupt. The hardware interrupt stops execution of non-essential program instructions, such that the following method steps are executed immediately. After block 108, the method 100 proceeds to block 112.

At block 112, the controller 12 records a first timestamp in response to receiving the start trigger signal. In an exemplary embodiment, the controller 12 retrieves the first timestamp from the system timer module of the controller 12. In a non-limiting example, the first timestamp along with a trigger signal type (i.e., start trigger signal) and one of the plurality of input ports 22 from which the start trigger signal was received (e.g., the first input port 22a) is stored in the media 16 of the controller 12. After block 112, the method 100 proceeds to block 114.

At block 114, the controller 12 performs a first error checking action. In an exemplary embodiment, to perform the first error checking action, the controller 12 identifies a previously received trigger signal type. The previously received trigger signal type includes one of: the start trigger signal and a stop trigger signal. In an exemplary embodiment, to identify the previously received trigger signal, the controller 12 accesses the media 16 and identifies the previously received trigger signal based on timestamps of trigger signals stored in the media 16. If the previously received trigger signal type is the start trigger signal, the method 100 proceeds to block 116. If the previously received trigger signal type is not the start trigger signal, the method 100 proceeds to block 118, as will be discussed in greater detail below.

At block 116, the controller 12 stores an error log in the media 16 of the controller 12. In an exemplary embodiment, the error log includes the first timestamp and the trigger signal type (as determined at block 112), the previously received trigger signal type (as determined at block 114), and one of the plurality of input ports 22 from which the start trigger signal was received (e.g., the first input port 22a). The error log is stored because receiving two start trigger signals in succession without a stop trigger signal constitutes an error state if the controller 12 is not configured to measure multiple latencies simultaneously.

However, in some embodiments, the controller 12 may be configured to measure multiple latencies simultaneously. For example, if it is known that a first transmission will be sent from the first DUT 24a to the second DUT 24b, and a second transmission will be sent from the first DUT 24a to the third DUT 24c, both transmissions may simultaneously be measured by the controller 12 because it is known that a stop trigger signal received by the second input port 22b corresponds to the first start trigger signal, and a stop trigger signal received by the third input port 22c corresponds to the second start trigger signal. Therefore, it should be understood that in some embodiments, the first error checking action performed at blocks 112 and 114 may be omitted or modified based on the configuration of the controller 12. After block 116, the method 100 proceeds to block 118, as will be discussed in greater detail below.

At block 110, the controller 12 receives a stop trigger signal from the second DUT 24b using the second input port 22b. In an exemplary embodiment, the stop trigger signal is a rising edge of a digital logic signal. In another exemplary embodiment, the stop trigger signal is a falling edge of a digital logic signal. In a non-limiting example, the stop trigger signal initiates a hardware interrupt. The hardware interrupt stops execution of non-essential program instructions, such that the following method steps are executed immediately. After block 110 the method 100 proceeds to block 120.

At block 120, the controller 12 records a second timestamp in response to receiving the stop trigger signal. In an exemplary embodiment, the controller 12 retrieves the second timestamp from the system timer module of the controller 12. In a non-limiting example, the second timestamp along with the trigger signal type (i.e., stop trigger signal) and one of the plurality of input ports 22 from which the start trigger signal was received (e.g., the second input port 22b) is stored in the media 16 of the controller 12. After block 120, the method 100 proceeds to block 122.

At block 122, the controller 12 performs a second error checking action. In an exemplary embodiment, to perform the second error checking action, the controller 12 identifies the previously received trigger signal type. The previously received trigger signal type includes one of: the start trigger signal and a stop trigger signal. In an exemplary embodiment, to identify the previously received trigger signal, the controller 12 accesses the media 16 and identifies the previously received trigger signal based on timestamps of trigger signals stored in the media 16. If the previously received trigger signal type is the stop trigger signal, the method 100 proceeds to block 124. If the previously received trigger signal type is not the start trigger signal, the method 100 proceeds to block 126.

At block 124, the controller 12 stores an error log in the media 16 of the controller 12. In an exemplary embodiment, the error log includes the second timestamp and the trigger signal type (as determined at block 120), the previously received trigger signal type (as determined at block 122), and one of the plurality of input ports 22 from which the stop trigger signal was received (e.g., the second input port 22*b*). The error log is stored because receiving two stop trigger signals in succession without a start trigger signal constitutes an error state if the controller 12 is not configured to measure multiple latencies simultaneously. As discussed above in reference to the first error checking action, it should be understood that in some embodiments, the second error checking action performed at blocks 122 and 124 may be omitted or modified based on the configuration of the controller 12. After block 124, the method 100 proceeds to block 118, as will be discussed in greater detail below.

At block 126, the controller 12 calculates a latency measurement. In an exemplary embodiment, the latency measurement is a difference between the first timestamp recorded at block 112 and the second timestamp recorded at block 120. Accordingly, the latency measurement represents an elapsed time between receiving the start trigger signal at block 108 and the stop trigger signal at block 110. In a non-limiting example, the latency measurement is stored in the media 16 of the controller 12. After block 126, the method 100 proceeds to block 128.

At block 128, the controller 12 calculates at least one latency measurement statistic. In an exemplary embodiment, after execution of the method 100 multiple times, a plurality of latency measurements are stored in the media 16 of the controller 12. Therefore, the at least one measurement statistic is calculated based on the plurality of latency measurements stored in the media 16 of the controller 12. In an exemplary embodiment, the at least one latency measurement statistic includes one or more of: a minimum latency measurement, a maximum latency measurement, an average latency measurement, a moving average latency measurement, a windowed average latency measurement, a standard deviation of the plurality of latency measurements, and/or the like. In a non-limiting example, the at least one latency measurement statistic is stored in the media 16 of the controller 12. After block 128, the method 100 proceeds to block 130.

At block 130, the controller 12 sets a flag indicating that a new latency measurement statistic is available. In the scope of the present disclosure, the flag refers to a single-bit variable or a status bit which is associated with a specific condition or event (i.e., that the at least one latency measurement statistic is available). The flag may have a set state or an unset state. The set state indicates that a new latency measurement statistic is available for transmission. The unset state indicates that no new latency measurement statistic is available for transmission. After block 130, the method 100 proceeds to block 118.

At block 118, the controller 12 evaluates whether the flag is set. If the flag is unset, the method 100 proceeds to enter a standby state at block 132. If the flag is set, the method 100 proceeds to block 134 to transmit data to the data acquisition system 26. Accordingly, in an exemplary embodiment, the controller 12 does not continuously transmit each latency measurement to the data acquisition system 26, but rather periodically transmits the at least one latency measurement statistic, resulting in reduced network bandwidth consumption and processing power use.

At block 134, the controller 12 uses the network interface 20 to transmit the at least one latency measurement statistic calculated at block 128 to the data acquisition system 26 and resets the flag to the unset state. In an exemplary embodiment, after receiving the at least one latency measurement statistic, the data acquisition system 26 saves the at least one latency measurement statistic in the non-transitory memory of the data acquisition system 26. In a non-limiting example, the data acquisition system 26 generates a graphical visualization of the at least one latency measurement statistic and displays the graphical visualization using the display of the data acquisition system 26. In a non-limiting example, the graphical visualization includes, for example, a scatterplot, a line graphic, a table, an animation, and/or the like, including any other kind of graphical representation of the at least one latency measurement statistic received from the controller 12. After block 134, the method 100 proceeds to enter the standby state at block 132.

In an exemplary embodiment, the controller 12 repeatedly exits the standby state 132 and restarts the method 100 at block 102. In a non-limiting example, the controller 12 exits the standby state 132 and restarts the method 100 on a timer, for example, every three hundred milliseconds. In an exemplary embodiment, the setup routine at block 104 and the calibration routine at block 106 are performed only upon initial startup of the system 10 and are not repeated during subsequent executions of the method 100.

Figure 3:
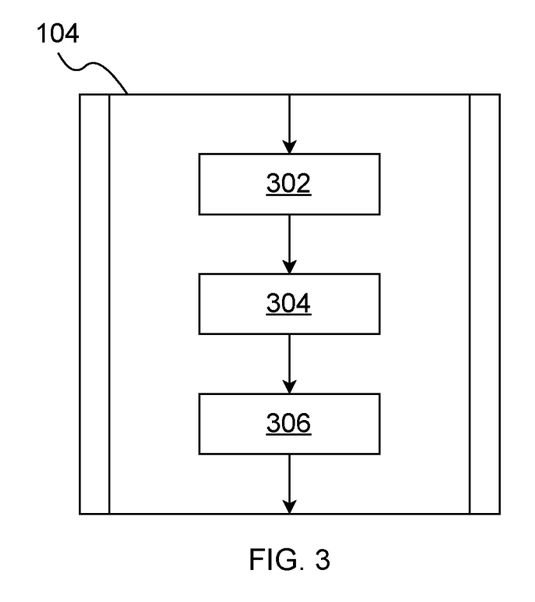
FIG. 3 is a flowchart of a setup routine, according to an exemplary embodiment.

Referring to FIG. 3, a flowchart of an exemplary embodiment of block 104 (i.e., the setup routine to configure the controller 12 to perform the method 100) is shown. The setup routine begins at block 302. At block 302, the controller 12 initializes variables for storage of program data, such as, for example, the first timestamp, the second timestamp, the previously received trigger signal type, and/or the like. In an exemplary embodiment, the variables are initialized in the media 16 of the controller 12. In another exemplary embodiment, the variables are initialized in a transitory memory of the controller 12 and may be erased upon restart of the controller 12. After block 302, the exemplary embodiment of block 104 proceeds to block 304.

At block 304, the controller 12 initializes the system timer module 18. In an exemplary embodiment, the controller 12 activates the system timer module 18 by setting bits in corresponding registers of the processor 14 to enable the system timer module 18. In a non-limiting example, the controller 12 may also configure aspects of the system timer module 18, such as speed and reset parameters of the system timer module 18. In an exemplary embodiment, the controller 12 also initializes a calibration offset value, which may be used to compensate for variations in the performance of the system timer module 18. In a non-limiting example, the system timer module 18 works under an assumption that a predetermined amount of time (e.g., one second) corresponds to a predetermined quantity of clock cycles of the processor 14 (e.g., one thousand clock cycles). However, due to factors such as temperature, humidity, supply voltage level, and the like, a clock speed of the processor 14 may vary. Therefore, the calibration offset value may be added to the predetermined quantity of clock cycles to adjust for clock speed variation. After block 304, the exemplary embodiment of block 104 proceeds to block 306.

At block 306, the controller 12 initializes the plurality of input ports 22. In an exemplary embodiment, the controller 12 sets bits in corresponding registers of the processor 14 to enable the plurality of input ports 22. In a non-limiting example, the controller 12 sets bits to configure the plurality of input ports 22 to act as input ports 22, rather than output ports. The controller 12 may additionally configure other parameters of the plurality of input ports 22, such as, for example, pull-up/pull-down resistances, enabling or disabling peripherals (e.g., an analog-to-digital converter), and/or the like. After block 306, the exemplary embodiment of block 104 is concluded, and the method 100 proceeds as discussed above.

Figure 4:
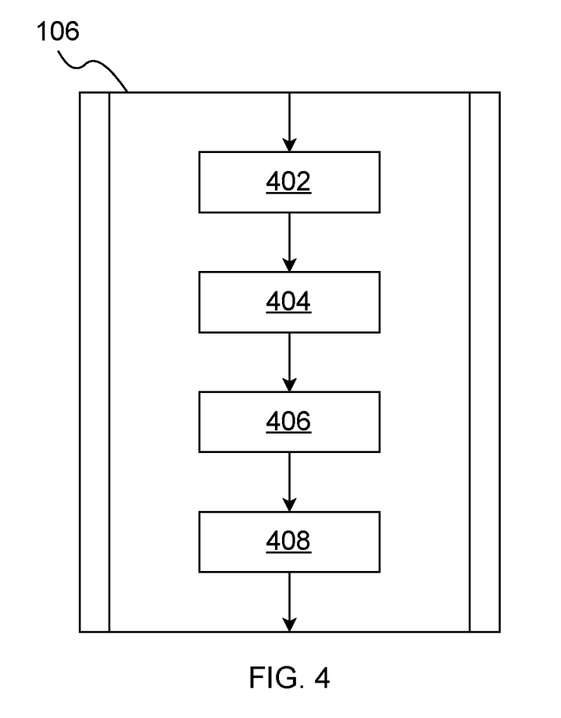
FIG. 4 is a flowchart of a calibration routine, according to an exemplary embodiment.

Referring to FIG. 4, a flowchart of an exemplary embodiment of block 106 (i.e., the calibration routine, also referred to as a calibration action) is shown. The exemplary embodiment of block 106 begins at block 402. At block 402, the controller 12 configures one of the plurality of input ports 22 as an output port, and connects the output port to another of the plurality of input ports 22. The controller 12 then provides a test pulse from the output port to the one of the plurality of input ports 22. In an exemplary embodiment, the test pulse is a digital pulse having a predetermined expected test duration (e.g., a predetermined expected period for which the pulse is high). After block 402, the exemplary embodiment of block 106 proceeds to block 404.

At block 404, the controller 12 measures an actual test duration of the test pulse using the one of the plurality of input ports 22. In an exemplary embodiment, the controller 12 records a third timestamp when the test pulse begins and a fourth timestamp when the test pulse ends. The difference between the fourth timestamp and the third timestamp is the actual test duration. In an exemplary embodiment, the output port is additionally in electrical communication with an external device, such as, for example, the data acquisition system 26. The external device also measures the actual test duration of the test pulse and transmits the measured actual test duration to the controller 12 using the network interface 20. Accordingly, clock speed variation of the processor 14 is isolated from the measurement by measuring with the external device. After block 404, the exemplary embodiment of block 106 proceeds to block 406.

At block 406, the controller 12 determines a difference between the actual test duration determined at block 404 and the predetermined expected test duration of the pulse produced at block 402. After block 406, the exemplary embodiment of block 106 proceeds to block 408.

At block 408, the controller 12 calibrates the system timer module 18 based at least in part on the difference determined at block 406. In an exemplary embodiment, the controller 12 adjusts the calibration offset value of the system timer module 18 to account for the difference between the actual test duration determined at block 404 and the predetermined expected test duration of the pulse produced at block 402. Accordingly, the calibration action allows for calibration of the system timer module 18. After block 408, the exemplary embodiment of block 106 is concluded, and the method 100 proceeds as discussed above.

Figure 5:
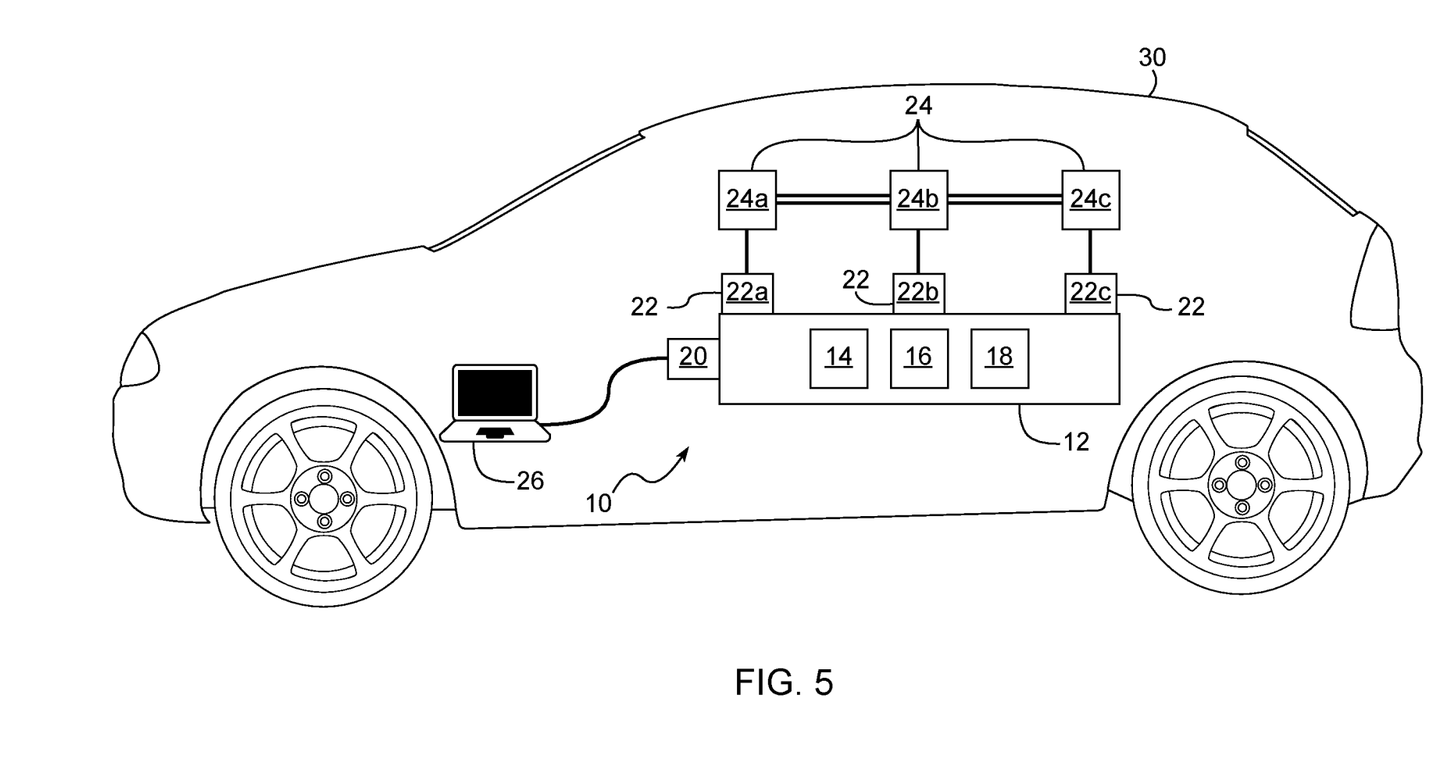
FIG. 5 is a schematic diagram of a latency measurement system in a vehicle, according to an exemplary embodiment.

Referring to FIG. 5, a schematic diagram of the system 10 in use in a vehicle 30 is shown. While a passenger vehicle is illustrated, it should be appreciated that the vehicle 30 may be any type of vehicle without departing from the scope of the present disclosure. In an exemplary embodiment, the system 10 and method 100 are used within a vehicle to analyze network communications between vehicle devices. In a non-limiting example, the first DUT 24a is a vehicle control unit (VCU), the second DUT 24b is a vehicle rain sensor, and the third DUT 24c is a vehicle windscreen wiper actuator. The plurality of DUTs 24 are in electrical communication via a CAN bus. The system 10 is used to measure network communication latency between the plurality of DUTs 24 on the CAN bus. In a first exemplary embodiment, the system 10 is integrated into the vehicle 30 as a discrete component and may be used for diagnostic purposes by vehicle systems, such as the VCU, to determine a health and functionality of vehicle systems. In a second exemplary embodiment, the system 10 is integrated into one of the plurality of DUTs 24, for example, in the VCU. In a third exemplary embodiment, the system 10 is a diagnostic system external to the vehicle 30 which may be connected to the vehicle 30 by a service technician or an engineer to diagnose issues and/or assist in development and/or improvement of vehicle systems and features.

The system 10 and method 100 of the present disclosure offer several advantages. In some vehicle systems, controller units may be aggregated in a central location, potentially far from other vehicle components. The system 10 and method 100 may be used to quantify transmission latency between vehicle devices, allowing for faster development of new vehicle electrical systems and diagnosis of faults in current vehicle electrical systems. By using start and stop trigger pulses produced by the plurality of DUTs 24, the system 10 and method 100 are agnostic of the specific communication protocol for which the latency is being measured, thus making the system 10 and method 100 versatile and flexible for various applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A latency measurement system, the latency measurement system comprising:
a controller having a first input port and a second input port, wherein the controller is programmed to:
receive a start trigger signal using the first input port;
perform a first action in response to receiving the start trigger signal, wherein to perform the first action, the controller is further programmed to:
record a first timestamp in response to receiving the start trigger signal; and
perform a first error checking action in response to receiving the start trigger signal, wherein to perform the first error checking action, the controller is further programmed to:
identify a previously received trigger signal type, wherein the trigger signal type includes at least one of the start trigger signal and a stop trigger signal; and
store an error log in a non-transitory memory of the controller in response to determining that the previously received trigger signal type is the start trigger signal;
receive the stop trigger signal using the second input port;

perform a second action in response to receiving the stop trigger signal; and determine a latency measurement based at least in part on the first action and the second action.

2. The latency measurement system of claim 1, wherein the first input port is in electrical communication with a first device under test (DUT), and wherein the start trigger signal is at least one of a rising edge and a falling edge of a digital logic signal.

3. The latency measurement system of claim 1, wherein the second input port is in electrical communication with a second device under test (DUT), and wherein the stop trigger signal is at least one of a rising edge and a falling edge of a digital logic signal.

4. The latency measurement system of claim 1, wherein to perform the second action, the controller is further programmed to:

record a second timestamp in response to receiving the stop trigger signal;

perform a second error checking action in response to receiving the stop trigger signal;

calculate the latency measurement based at least in part on the first timestamp and the second timestamp, wherein the latency measurement is stored in a non-transitory memory of the controller; and calculate at least one latency measurement statistic based at least in part on a plurality of latency measurements stored in the non-transitory memory of the controller.

5. The latency measurement system of claim 4, wherein to perform the second error checking action, the controller is further programmed to:

identify a previously received trigger signal type, wherein the trigger signal type includes one of the start trigger signal and the stop trigger signal; and store an error log in the non-transitory memory of the controller in response to determining that the previously received trigger signal type is the stop trigger signal.

6. The latency measurement system of claim 4, wherein the controller further includes a network interface in electrical communication with a data acquisition system, and wherein the controller is further programmed to:

transmit the at least one latency measurement statistic to the data acquisition system using the network interface.

7. The latency measurement system of claim 1, wherein the controller further includes a first output port in electrical communication with at least one of the first input port and the second input port, and wherein the controller is further programmed to:

perform a calibration action using at least the first output port and at least one of the first input port and the second input port.

8. The latency measurement system of claim 7, wherein to perform the calibration action, the controller is further programmed to:

provide a test pulse having a predetermined expected test duration to at least one of the first input port and the second input port using the first output port;

measure an actual test duration of the test pulse using at least one of the first input port and the second input port;

determine a difference between the actual test duration and the predetermined expected test duration; and calibrate a system timer module of the controller based at least in part on the difference between the actual test duration and the predetermined expected test duration.

9. A method for measuring network latency, the method comprising:

electrically connecting a plurality of devices under test (DUTs) to a controller, wherein each of the plurality of DUTs is connected to one of a plurality of input ports of the controller, wherein each of the plurality of DUTs is configured to send a start trigger signal to one of the plurality of input ports upon transmitting a data message, and wherein each of the plurality of DUTs is configured to send a stop trigger signal to one of the plurality of input ports upon receiving the data message;

receiving the start trigger signal;

performing a first action in response to receiving the start trigger signal, wherein performing the first action further comprises:

recording a first timestamp in a non-transitory memory of the controller in response to receiving the start trigger signal; and performing a first error checking action in response to receiving the start trigger signal;

receiving the stop trigger signal;

performing a second action in response to receiving the stop trigger signal, wherein performing the second action further comprises:

recording a second timestamp in response to receiving the stop trigger signal;

performing a second error checking action in response to receiving the stop trigger signal;

calculating a latency measurement based at least in part on the first timestamp and the second timestamp;

storing the latency measurement in the non-transitory memory of the controller; and calculating at least one latency measurement statistic based at least in part on a plurality of latency measurements stored in the non-transitory memory of the controller; and determining the latency measurement based at least in part on the first action and the second action.

10. The method of claim 9, wherein performing the first error checking action further comprises:

identifying a previously received trigger signal type, wherein the trigger signal type includes at least one of the start trigger signal and the stop trigger signal; and storing an error log in the non-transitory memory of the controller in response to determining that the previously received trigger signal type is the start trigger signal.

11. The method of claim 9, wherein performing the second error checking action further comprises:

identifying a previously received trigger signal type, wherein the trigger signal type includes at least one of the start trigger signal and the stop trigger signal; and storing an error log in the non-transitory memory of the controller in response to determining that the previously received trigger signal type is the stop trigger signal.

12. The method of claim 9, further comprising:

transmitting the at least one latency measurement statistic to a data acquisition system using a network interface of the controller.

13. The method of claim 12, further comprising:

receiving the at least one latency measurement statistic using the data acquisition system; and generating a graphical visualization of the at least one latency measurement statistic using the data acquisition system.

14. A latency measurement system for a vehicle, the latency measurement system comprising:
a controller having a first input port in electrical communication with a first device under test (DUT), a second input port in electrical communication with a second device under test (DUT), and a network interface in electrical communication with a data acquisition system, wherein the controller is programmed to:
receive a start trigger signal using the first input port;
perform a first action in response to receiving the start trigger signal, wherein to perform the first action, the controller is further programmed to:
record a first timestamp in response to receiving the start trigger signal;
identify a previously received trigger signal type, wherein the trigger signal type includes at least one of the start trigger signal and a stop trigger signal; and
store an error log in a non-transitory memory of the controller in response to determining that the previously received trigger signal type is the start trigger signal;
receive the stop trigger signal using the second input port;
perform a second action in response to receiving the stop trigger signal; and
determine a latency measurement based at least in part on the first action and the second action;
calculate at least one latency measurement statistic based at least in part on a plurality of latency measurements stored in a non-transitory memory of the controller; and
transmit the at least one latency measurement statistic to the data acquisition system using the network interface.

15. The latency measurement system of claim 14, wherein to perform the second action, the controller is further programmed to:
record a second timestamp in response to receiving the stop trigger signal;
identify a previously received trigger signal type, wherein the trigger signal type includes at least one of the start trigger signal and the stop trigger signal;
store an error log in the non-transitory memory of the controller in response to determining that the previously received trigger signal type is the stop trigger signal;
calculate the latency measurement based at least in part on the first timestamp and the second timestamp; and
store the latency measurement in the non-transitory memory of the controller.

* * * * *